United States Patent
Yamaoka et al.

(10) Patent No.: US 9,060,463 B2
(45) Date of Patent: Jun. 23, 2015

(54) LAWNMOWER WITH OPERATION PROTECTION AND SAFETY SWITCH MECHANISM THEREOF

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN); Xiandian Shao, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 104 days.

(21) Appl. No.: 13/962,389

(22) Filed: Aug. 8, 2013

(65) Prior Publication Data

US 2014/0102063 A1 Apr. 17, 2014

(30) Foreign Application Priority Data

Oct. 15, 2012 (CN) .......................... 2012 1 0387914

(51) Int. Cl.
*A01D 34/67* (2006.01)
*A01D 34/82* (2006.01)
*A01D 34/68* (2006.01)
*H01H 15/10* (2006.01)
*H01H 3/16* (2006.01)

(52) U.S. Cl.
CPC .............. *A01D 34/828* (2013.01); *A01D 34/68* (2013.01); *H01H 15/10* (2013.01); *A01D 34/6806* (2013.01); *H01H 3/16* (2013.01)

(58) Field of Classification Search
CPC ............ A01D 34/824; A01D 34/6806; A01D 34/828; A01D 34/63; A01D 34/475; A01D 34/6818; A01D 43/0631; A01D 2034/6843; H01H 9/06; H01H 3/36; H01H 7/0833
USPC ............. 56/10.5, 10.8, 11.3–11.9, 16.7, 16.9, 56/17.5; 180/53.6, 19.3, 272, 273; 200/541; 307/115
See application file for complete search history.

(56) References Cited

U.S. PATENT DOCUMENTS

| | | | | |
|---|---|---|---|---|
| 4,003,190 A | * | 1/1977 | Braun et al. | .................... 56/10.5 |
| 4,981,011 A | * | 1/1991 | Olejak | ........................ 56/10.2 R |
| 5,138,824 A | * | 8/1992 | Oshima et al. | ............. 56/10.2 R |
| 6,404,078 B1 | * | 6/2002 | Thomas et al. | ............... 307/115 |
| 6,644,002 B2 | * | 11/2003 | Trefz | .............................. 56/10.8 |
| 7,591,126 B2 | * | 9/2009 | Cox | ................................. 56/10.8 |

* cited by examiner

*Primary Examiner* — Robert Pezzuto
(74) *Attorney, Agent, or Firm* — Greenberg Traurig, LLP

(57) ABSTRACT

A lawnmower with operation protection and a safety switch mechanism. The safety switch mechanism include: an inner pipe and a pipe sleeve slidably connected with and enclosing the inner pipe, a safety switch with a contact tab mounted inside the pipe sleeve, a trigger configured to trigger the safety switch by contacting the contact tab when the inner pipe slides, and an elastomer configured to drive the trigger to keep from contacting with the contact tab. All of the safety switch, the trigger and the elastomer are arranged on the same side of the inner pipe. The safety switch mechanism functions to disable the motor upon accidental proximity of the operator to the cutter body to thereby lower the possibility of an accident.

20 Claims, 4 Drawing Sheets

LAWNMOWER WITH OPERATION PROTECTION AND SAFETY SWITCH MECHANISM THEREOF

RELATED APPLICATION INFORMATION

This application claims the benefit of CN 201210387914.9, filed on Oct. 15, 2012, the disclosure of which is incorporated herein by reference in its entirety.

FIELD OF THE INVENTION

The present disclosure relates to a lawnmower and a safety protection apparatus thereof, and more particularly to a lawnmower with operation protection and a safety switch mechanism thereof.

BACKGROUND

A lawnmower is a tool that is used to provide lawn care primarily by using a motor to activate a blade in a cutter body to cut excessively long grass. The motor of the lawnmower is relatively powerful for efficient grass cutting and consequently brings some potential danger to the operator. Currently the operator is typically spaced by a long handle from the cutter body as far as possible to thereby avoid potential danger. The handle tends to be separated into two retractable segments to make storage of the lawnmower convenient. The handle may be retracted by accident in operation and thereby expose both hands of the operator to danger resulting from close proximity to the cutter body.

SUMMARY

In order to solve the shortcoming of the prior art, an objective of the described lawnmower is to provide a safety switch mechanism capable of timely disabling a lawnmower upon accidental retraction of a handle thereof.

In order to obtain the foregoing objective, the described lawnmower is provided with a slide-triggered safety switch mechanism. The slide-triggered safety switch mechanism includes an inner pipe and a pipe sleeve capable of rotation relative to each other, wherein the slide-triggered safety switch mechanism further includes a safety switch assembly mounted inside the pipe sleeve. The inner pipe is equipped with a safety shift structure and the safety switch assembly includes a safety switch and a trigger assembly configured to trigger the safety switch when the safety shift structure of the inner pipe is disengaged from a safety location and to reset the safety switch when the safety shift structure returns to the safety location.

By way of further example, the subject lawnmower with operation protection includes a cutter body and a hollow level-1 handle rotatably connected with the cutter body, the cutter body being equipped with a motor and a controller eclectically connected therewith, wherein the lawnmower further includes the forgoing safety switch mechanism, the pipe sleeve is arranged at an end of the hollow level-1 handle, the inner pipe is embedded through the pipe sleeve inside the level-1 handle to constitute a slidable connection therewith, and the safety switch is electrically connected with the controller.

As will be better appreciated from the detailed description which follows, the subject lawnmower has the advantage of providing a motor that will be disabled automatically when an operator approaches the cutter body by accident to thereby lower the possibility of an accident.

DETAILED DESCRIPTION OF PREFERRED EMBODIMENTS

By way of example only, an exemplary lawnmower will now be described in detail with reference to the drawings showing preferred embodiments thereof.

Figure 1:
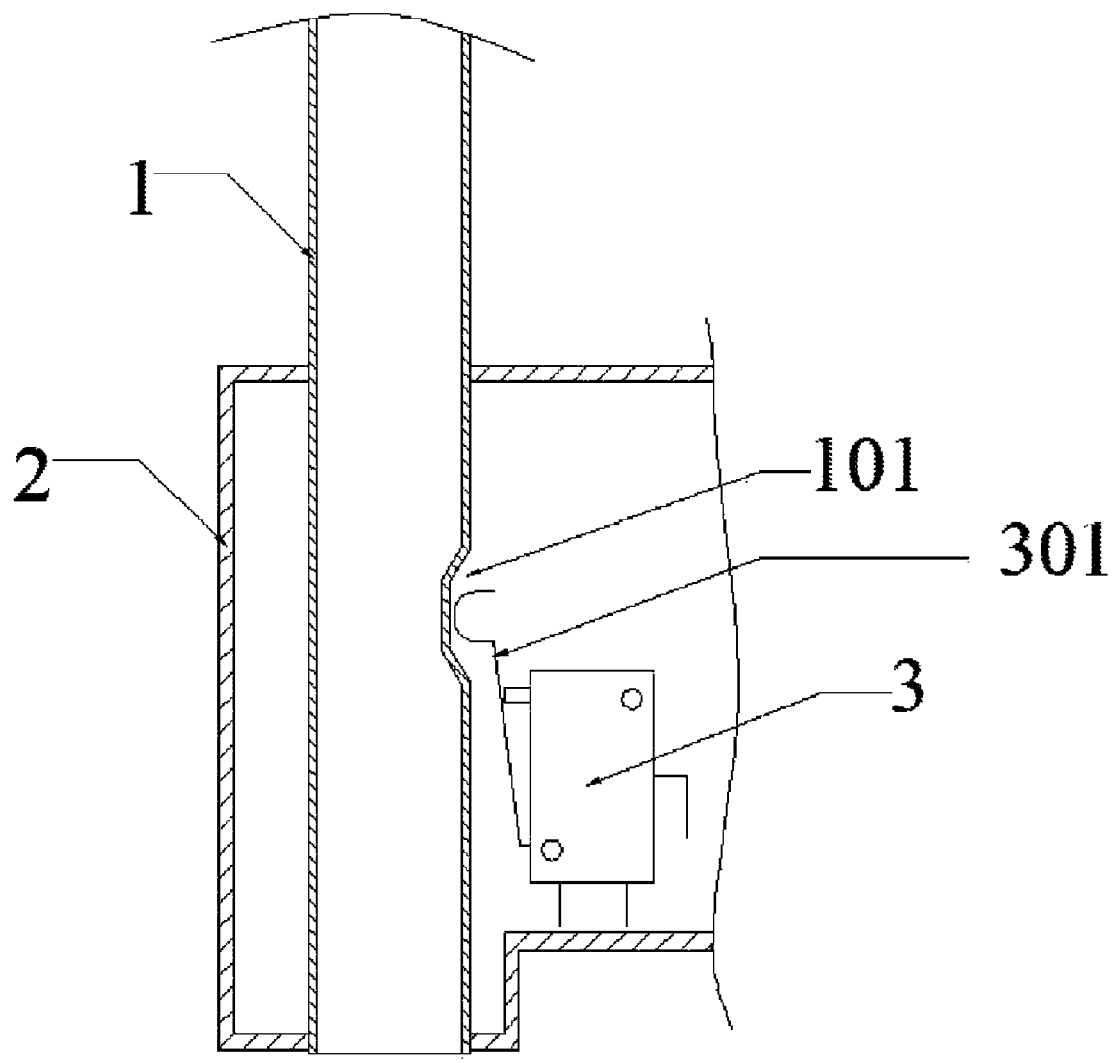
FIG. 1 is a schematic structural diagram of an exemplary slide-triggered safety switch mechanism constructed according to the description which follows.
Figure 2:
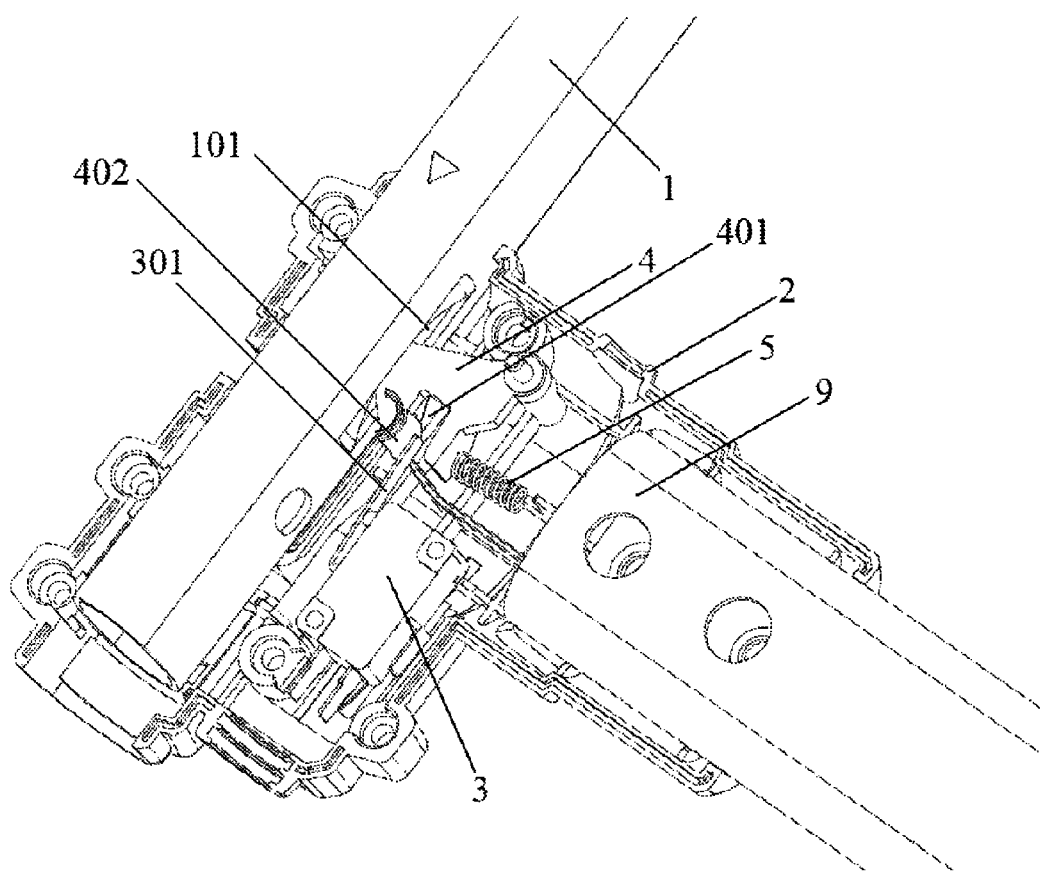
FIG. 2 is a schematic structural diagram of a further, exemplary slide-triggered safety switch mechanism constructed according to the description which follows

Referring to FIG. 1 and FIG. 2, a slide-triggered safety switch mechanism generally includes an inner pipe 1, a pipe sleeve 2 and a safety switch assembly, wherein the safety switch assembly includes a safety switch 3 and a trigger assembly for triggering the safety switch 3. The safety switch 3 and the trigger assembly are arranged inside the pipe sleeve 2. In general, the trigger assembly functions to trigger the safety switch when a safety shift structure of the pipe sleeve is disengaged from a safety location and to reset the safety switch when the safety shift structure returns to the safety location.

Referring to the embodiment illustrated in FIG. 1, as a simplified technical implementation, the trigger assembly includes a contact tab 301 which includes one end connected with the safety switch 3, and the other end being a free end, and which is pressed inwardly towards the safety switch 3 by the pipe wall of the inner pipe 1 to trigger the safety switch 3 when the inner pipe 1 slides, wherein the contact tab 301 itself has some elasticity, and wherein the inner pipe 1 slides to move a receiving groove 101 that serves as the safety shift structure and the safety location. When the contact tab 301 is positioned within the safety location, the contact tab 301 is free of external force and the safety switch 3 is not triggered. The safety shift structure on the inner pipe 1 is configured to accommodate the receiving groove 101 at the free end of the released contact tab 301.

This technical implementation dependent upon on the elasticity of the contact tab 301 itself may cause failure after frequently use thereof.

Referring to an embodiment illustrated in FIG. 2, the present embodiment provides a more reliable preferred implementation in which the trigger assembly generally includes a trigger 4 and an elastomer 5, both of which are arranged together with the safety switch 3 on the same side of the inner pipe 1. The safety shift structure on the inner pipe 1 is the receiving groove 101 for accommodating the trigger 4.

In this arrangement, the inner pipe 1 is slidably connected with the pipe sleeve 2 which generally encases at least the relevant portion of the inner pipe 1, and the inner pipe 1 with a long size can pass through the pipe sleeve 2 and slide therein. The safety switch 3 is arranged inside the pipe sleeve 2 and is fixedly connected to the pipe sleeve 2, the contact tab 301 has one end fixedly connected with the safety switch 3, and the other end being a free end. The body of the switch is further arranged with a contact thereon which can be contacted and pressed for ON-OFF control when the free end of the contact tab 301 is pressed. It is certain that a mechanical structure for triggering the safety switch can alternatively be another structure if the structure can be caused to activate an ON-OFF contact upon the trigger being moved and to deactivate the ON-OFF contact upon the trigger being returned to the safety position. For example, in another implementation, a helical spring is arranged around the contact, with one end fixed with the switch body of the safety switch, and the other free end arranged with a contact plate. Moreover, there are numerous similar implementations which will not be described more.

As further shown in the figures, the trigger 4 is mounted inside the pipe sleeve 2 and primarily functions as a bridge to transfer energy and to trigger the free end of the contact tab 301 when the inner pipe 1 slides relative to the pipe sleeve 2. As a preferred implementation, the trigger 4 is rotatably connected with the pipe sleeve 2 with the rotation axis perpendicular to the direction in which the inner pipe 1 and the pipe sleeve 2 are slidably connected. In this way, the trigger 4 can depress or release the contact tab 301 through rotation.

Generally, it is desired that the inner pipe 1 includes a normal operation location relative to the pipe sleeve 2, that is, at this location, the trigger 4 is not acted on by the inner pipe 1 to trigger the safety switch 3, however once the inner pipe 1 slides out of the range of this location, the trigger 4 is acted upon. A reset component functions to reset the safety switch 3 when the inner pipe 1 slides again back to the range of the operation or safety location. The reset component is essentially an energy accumulation member which can convert the energy from the trigger 4 being pressed by external force into its own energy and release the energy upon release of the external force to thereby reset the trigger 4. With this characteristic, the reset component can be embodied as a magnetic member or an elastic member, either of which has an energy accumulation characteristic. For a simplified structure, the reset component is an elastomer 5 with elasticity to reset the trigger 4 by means of elastic energy.

Preferably, the elastomer 5 is a helical spring with one end fixedly connected with the pipe sleeve 2 and the other end pressed against the trigger 4, or a torsion spring arranged at the rotation axis of the trigger 4.

As a preferred implementation, for the foregoing operation location, the receiving groove 101 for accommodating the abovementioned trigger 4 is arranged on the side of the inner pipe 1 facing the trigger 4. When the end of the trigger 4 facing the inner pipe 1 lies in the range of the receiving groove 101, the trigger 4 driven by the elastomer 5 does not trigger the safety switch 3 but allows the lawnmower to operate normally. When there is an accident or improper operation, the inner pipe 1 slides relative to the pipe sleeve 2 (in the direction of an operator proximate the cutter body), the end of the trigger 4 is displaced from the receiving groove 101, and the trigger 4 is pressed by the pipe wall of the inner pipe 1 to rotate and contact the contact tab 301 to trigger the safety switch 3. Certainly, this is just one technical implementation and there are numerous possible technical implementations if only the trigger 4 can have a sufficient space at the operation location to be free of being pressed and can be pressed at other locations.

In order to slide the trigger 4 into and out of the receiving groove 101 through rotation, a round and smooth end is formed on the trigger 4 for contact with the inner pipe 1, and accordingly the receiving groove 101 is also preferably provided with an arc-like groove.

As a preferred implementation, in order to make the trigger 4 contact with the contact tab 301 more firmly, a notched groove 401 is formed in the trigger 4 for accommodating and contacting the free end of the contact tab 301. An arc-like contact surface 402 is formed on the side of the notched groove 401 proximate to the inner pipe 1, the area of which is much larger than that of the free end of the contact tab 301 so as to able to ensure reliability of trigger 4.

Figure 3:
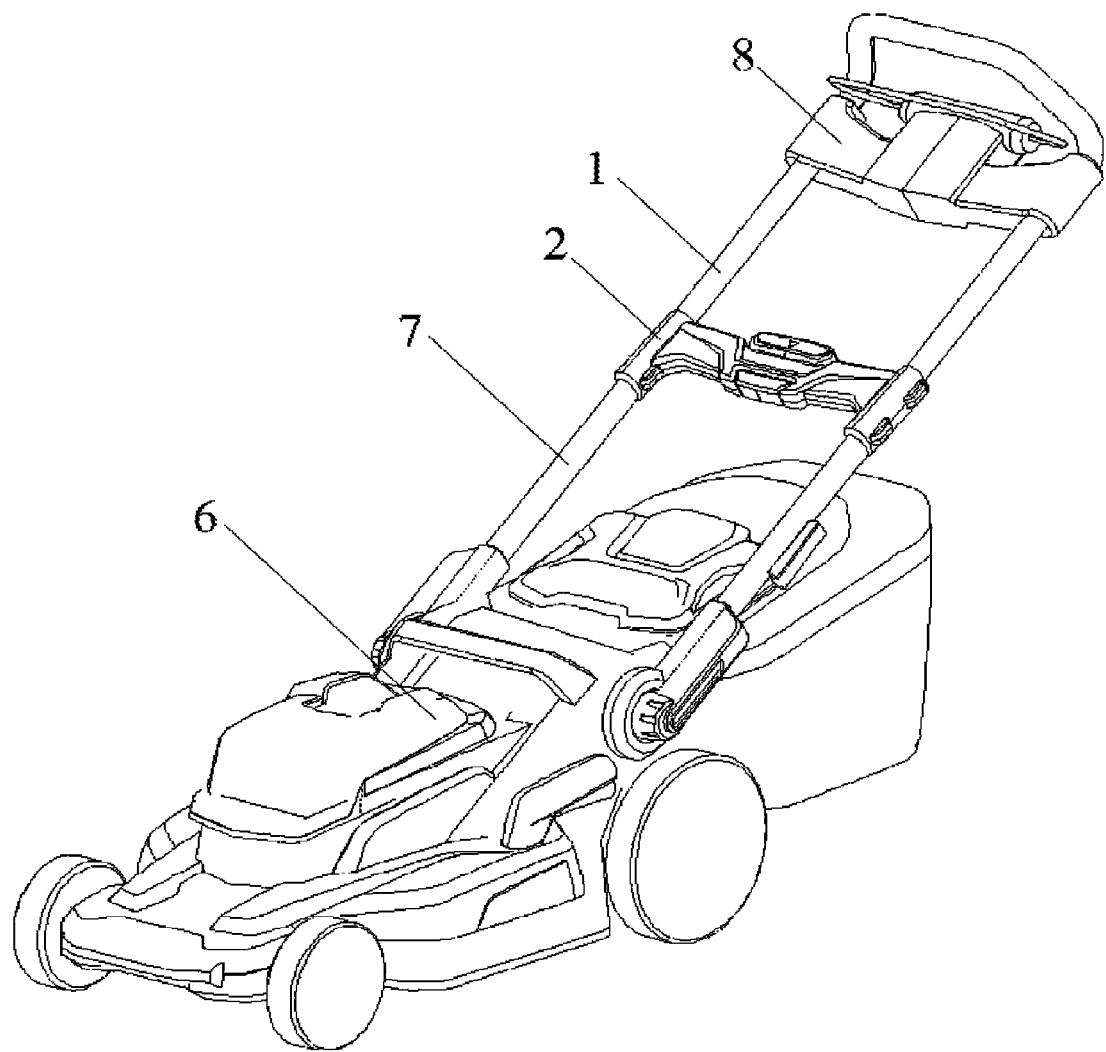
FIG. 3 is a schematic structural diagram of an exemplary lawnmower constructed according to the description which follows.
Figure 4:
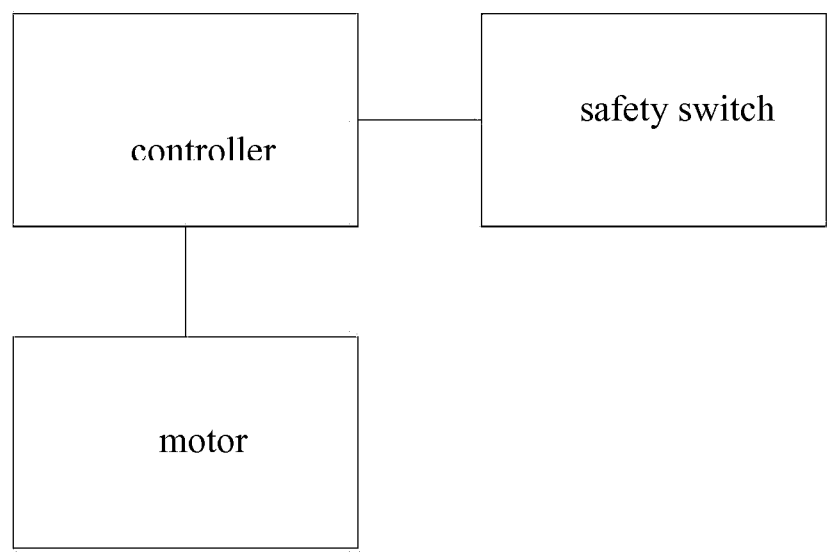
FIG. 4 is a circuit block diagram of an exemplary lawnmower constructed according to the description which follows.

Referring to FIG. 3 and FIG. 4, a lawnmower having the described safety feature includes a cutter body 6, a level-1 handle 7 and the foregoing safety switch mechanism constructed according to the preferred embodiments. Specifically, the cutter body 6 is equipped with a motor, a control circuit to control the motor, a blade, etc. which are primary parts for the lawnmower to operate. The level-1 handle 7, which is rotatably connected with the cutter body 6, serves as a first level of the retractable handle and is hollow to accommodate the inner pipe 1 of the safety switch mechanism. Actually, the relatively slidable connection of the inner pipe 1 and the pipe sleeve 2 is achieved by the slidable connection of the inner pipe 1 and the level-1 handle 7 and the fixed connection of the pipe sleeve 2 and the level-1 handle 7. More specifically, the pipe sleeve 2 is arranged at a free end of the level-1 handle 7. The inner pipe 1 is embedded through the pipe sleeve 2 in the level-1 handle 7 to constitute a slidable connection therewith, and an operation handle 8 is arranged at the free end of the inner pipe 1. The safety switch is electrically connected with the controller which is in turn electrically connected with the motor so that the safety switch can control the motor to operate.

Referring to FIG. 2, when the inner pipe 1 is retracted accidently into the level-1 handle 7, an operator may be in danger due to excessive proximity to the cutter body 6 while operating the operation handle 8, and at this time the safety switch 3 is triggered and the motor is disabled, and further to reduce the possibility of the operator being subject to danger.

By way of example, the inner pipe 1 may be retracted accidently into the level-1 handle 7 when sufficient force is provided to move the trigger 401, located in slot 101, against the bias of the spring 5.

The general principle, primary features and advantages of the invention have been illustrated and described above. Those skilled in the art shall appreciate that the foregoing embodiments will not limit the invention in any form and technical implementations derived with equal substitutions or equivalent variations shall fall into the scope of the invention.

What is claimed is:

1. A slide-triggered safety switch mechanism, comprising:
an inner pipe and a pipe sleeve capable of movement relative to each other wherein the inner pipe is equipped with a safety shift structure; and
a safety switch assembly mounted inside the pipe sleeve wherein the safety switch assembly comprises a safety switch and a trigger assembly configured to trigger the safety switch when the safety shift structure of the inner pipe is moved relative to the pipe sleeve from a safety location and to reset the safety switch when the safety shift structure returns to the safety location.

2. The slide-triggered safety switch mechanism according to claim 1, wherein the trigger assembly comprises a moveable contact tab with one end fixedly connected with the safety switch and another other end being a free end for contacting the inner pipe wherein the moveable contact tab is biased to move towards a reset position when no external force is applied thereto by the inner pipe.

3. The slide-triggered safety switch mechanism according to claim 2, wherein the safety shift structure is a receiving groove configured to accommodate the free end of the moveable contact tab.

4. The slide-triggered safety switch mechanism according to claim 1, wherein the trigger assembly further comprises a moveable contact tab with one end fixedly connected with the safety switch, a trigger configured to contact the inner pipe and press the moveable contact tab to trigger the safety switch when the inner pipe slides relative to the pipe sleeve, and a reset component configured to move the trigger towards a reset position when no external force is applied thereto by the inner pipe to keep the trigger from triggering the safety switch, and wherein another end of the moveable contact tab is a free end for contacting and cooperation with the trigger.

5. The slide-triggered safety switch mechanism according to claim 4, wherein the safety shift structure is a receiving groove configured to accommodate the trigger.

6. The slide-triggered safety switch mechanism according to claim 5, wherein all of the safety switch, the trigger and the reset component are arranged on the same side of the inner pipe, and the trigger is arranged between the inner pipe and the reset component.

7. The slide-triggered safety switch mechanism according to claim 5, wherein the trigger is provided with a notched groove configured to accommodate and contact the free end of the moveable contact tab, and an arc-like contact surface is formed on a side of the notched groove proximate to the inner pipe.

8. The slide-triggered safety switch mechanism according to claim 5, wherein the trigger is rotatably connected with the pipe sleeve.

9. The slide-triggered safety switch mechanism according to claim 8, wherein the reset component is an elastomer with elasticity to move the trigger towards the reset position by means of elastic energy and wherein the elastomer is at least one of a helical spring with one end fixedly connected with the pipe sleeve and another end pressed against the trigger and a torsion spring arranged at a rotation axis of the trigger.

10. The slide-triggered safety switch mechanism according to claim 9, wherein the rotation axis of the trigger is perpendicular to the direction in which the inner pipe is slideably connected to the pipe sleeve.

11. The slide-triggered safety switch mechanism according to claim 10, wherein the trigger is provided with a round and smooth end for contacting with the inner pipe.

12. A lawnmower with operation protection, comprising:
a cutter body and a hollow level-1 handle rotatably connected with the cutter body;
a motor carried by the cutter body;
a controller electrically connected to the motor to control the operation thereof; and
a slide-triggered safety switch mechanism comprising an inner pipe and a pipe sleeve capable of movement relative to each other wherein the inner pipe is equipped with a safety shift structure and a safety switch assembly mounted inside the pipe sleeve wherein the safety switch assembly comprises a safety switch and a trigger assembly configured to trigger the safety switch when the safety shift structure of the inner pipe is moved relative to the pipe sleeve from a safety location and to reset the safety switch when the safety shift structure returns to the safety location;
wherein the pipe sleeve is arranged at an end of the hollow level-1 handle, the inner pipe is at least partially encased within the pipe sleeve inside the level-1 handle to constitute a slidable connection therewith, and the safety switch is electrically connected with the controller.

13. The lawnmower with operation protection according to claim 12, wherein the trigger assembly comprises a moveable contact tab with one end fixedly connected with the safety switch and another end being a free end for contacting the inner pipe wherein the moveable contact tab is biased to move towards a reset position when no external force is applied thereto by the inner pipe and wherein the safety shift structure is a receiving groove configured to accommodate the free end of the moveable contact tab.

14. The lawnmower with operation protection according to claim 12, wherein the trigger assembly further comprises a moveable contact tab with one end fixedly connected with the safety switch a trigger configured to contact the inner pipe and press the moveable contact tab to trigger the safety switch when the inner pipe slides relative to the pipe sleeve, and a reset component configured to move the trigger towards a rest position when no external force is applied thereto by the inner pip to keep from triggering the safety switch and wherein another end of the moveable contact tab is a free end for contacting and cooperation with the trigger.

15. The lawnmower with operation protection according to claim 14, wherein the safety shift structure is a receiving groove configured to accommodate the trigger, and all of the safety switch, the trigger and the reset component are arranged on the same side of the inner pipe, and the trigger is arranged between the inner pipe and the reset component.

16. The lawnmower with operation protection according to claim 15, wherein the trigger is provided with a notched groove configured to accommodate and contact the moveable contact tab, and an arc-like contact surface is formed on a side of the notched groove proximate to the inner pipe.

17. The lawnmower with operation protection according to claim 15, wherein the trigger is rotatably connected with the pipe sleeve.

18. The lawnmower with operation protection according to claim 17, wherein the reset component is an elastomer with elasticity to move the trigger towards the reset position by means of elastic energy and wherein the elastomer is at least one of a helical spring with one end fixedly connected with the pipe sleeve and another end pressed against the trigger and a torsion spring arranged at a rotation axis of the trigger.

19. The lawnmower with operation protection according to claim 18, wherein the rotation axis of the trigger is perpendicular to the direction in which the inner pipe is slidablely connected to the pipe sleeve.

20. The lawnmower with operation protection according to claim 19, wherein the trigger is provided with a round and smooth end for contact with the inner pipe.

\* \* \* \* \*